(No Model.) 2 Sheets—Sheet 1.
R. LORD.
HUB ATTACHING DEVICE.
No. 591,481. Patented Oct. 12, 1897.
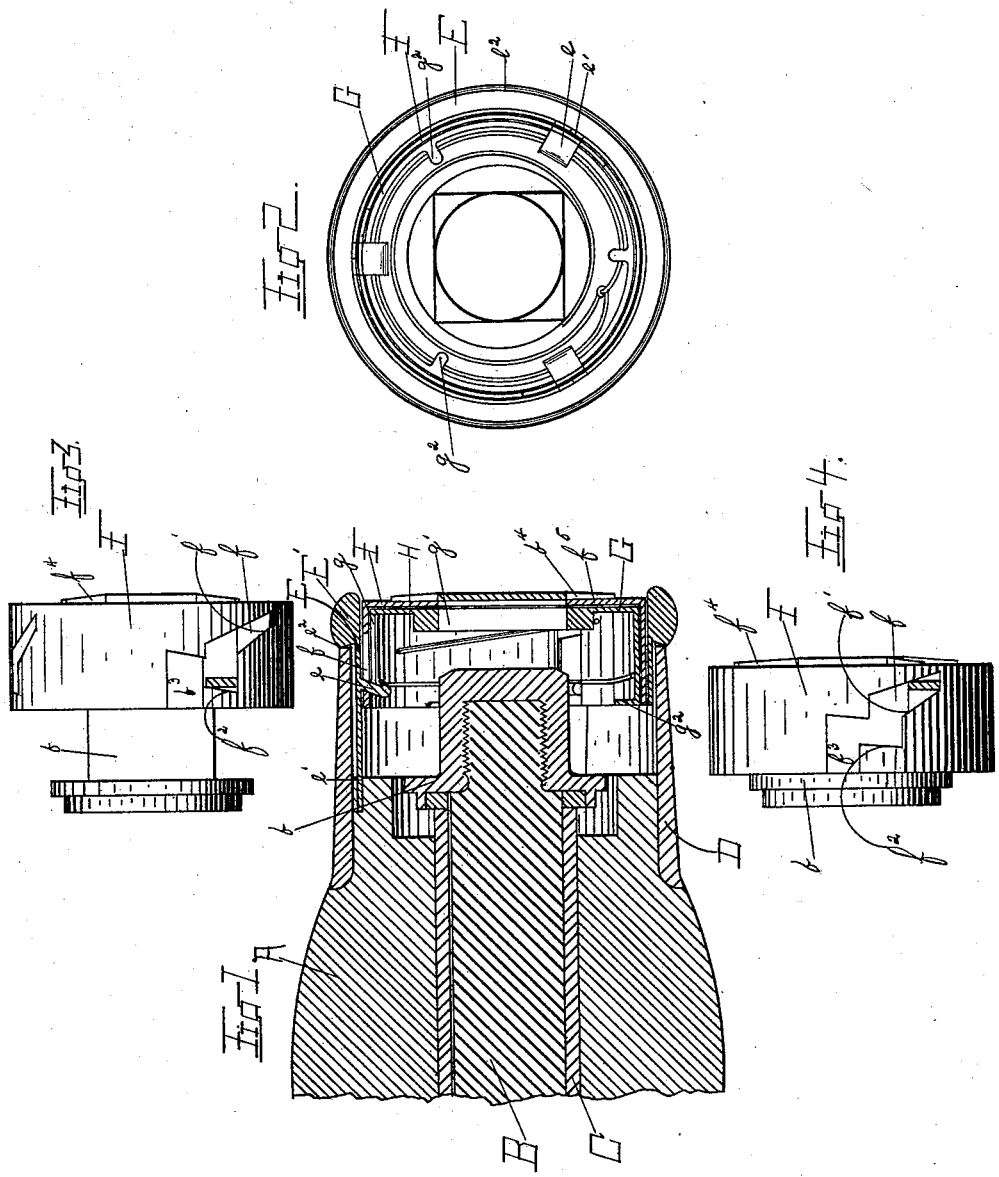
WITNESSES:
John Lord,
INVENTOR
Richard Lord
BY
Hallock & Lord
ATTORNEYS (No Model.) 2 Sheets—Sheet 2.
R. LORD.
HUB ATTACHING DEVICE.
No. 591,481. Patented Oct. 12, 1897.
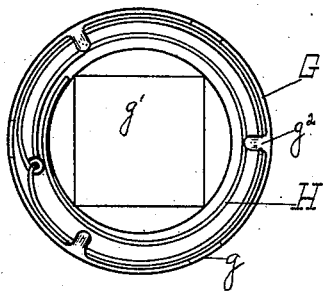
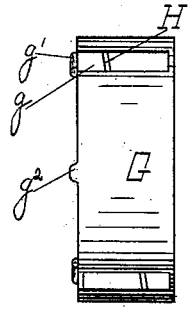
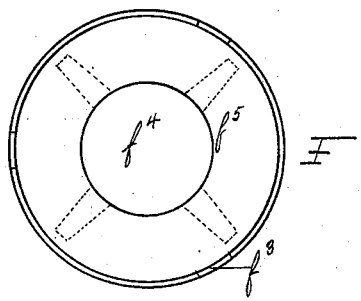
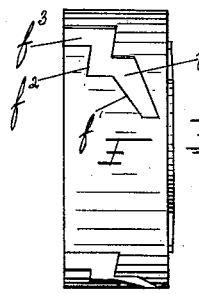
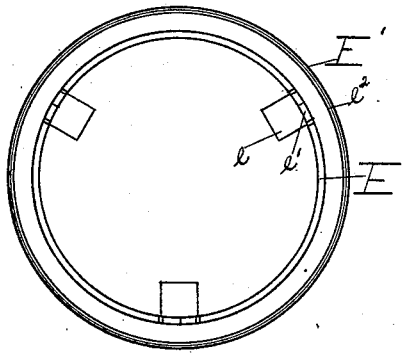
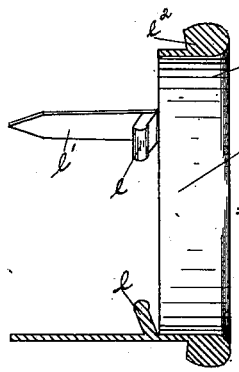
WITNESSES:
John Lord.
INVENTOR
Richard Lord
BY
Hallock Lord
ATTORNEYS

UNITED STATES PATENT OFFICE.

RICHARD LORD, OF KASSON, MINNESOTA.

HUB-ATTACHING DEVICE.

SPECIFICATION forming part of Letters Patent No. 591,481, dated October 12, 1897.

Application filed September 18, 1896. Serial No. 606,189. (No model.)

*To all whom it may concern:*

Be it known that I, RICHARD LORD, a citizen of the United States, residing at Kasson, in the county of Dodge and State of Minnesota, have invented certain new and useful Improvements in Hub-Attaching Devices; and I do hereby declare the following to be a full, clear, and exact description of the invention, such as will enable others skilled in the art to which it appertains to make and use the same.

This invention relates to hub-attaching devices; and it consists in certain improvements in the construction thereof, as will be hereinafter fully described, and pointed out in the claims.

More particularly, the invention relates to means of closing the outer end of the hub or band to exclude dust and to means for unscrewing the nut at the outer end of the spindle by means of the wheel, for securing the nut in place in the hub after the wheel is removed, and for screwing the nut to place, and other details which will appear fully hereinafter.

The invention is illustrated in the accompanying drawings, as follows:

Figure 1 shows a section of a hub, spindle, box, hub-band, &c., with my device in place therein. Fig. 2 shows a view from the hub end of the device detached. Figs. 3 and 4 show side views of the cam-ring and its relative position in engagement and out of engagement with the axle-nut. Fig. 5 shows a hub-end view of the wrench-ring; Fig. 6, a side view of the same device. Fig. 7 shows a hub-end view of the cam-ring. Fig. 8 shows a side view of the same piece. Fig. 9 shows a hub-end view of the lug-ring. Fig. 10 shows a side view of the same piece.

A marks the hub; B, the spindle; $b$, the axle-nut; C, the hub-box, and D the hub-band. These parts may be of the usual construction.

A lug-ring E, having the prongs $e'$, is inserted in the hub or point band and the prongs driven into the wood of the hub, thus securing the ring in position and locking it against axial movement relatively to the hub. The outer part of the lug-ring forms an extension E', which extends the point-band. The shoulder $e^2$ brings the extension out radially flush with the band. The back of this shoulder rests on the end of the band when the lug-ring and extension are in place. Three lugs $e$ extend inwardly from the lug-ring. These lugs are positioned about midway between the end of the extension and the hub and extend through the cam-slots $f$ of the cam-ring F and into and through the slots $g$ in the wrench-ring G. Inside the wrench-ring G is a spring H, which rests on the lugs $e$ and is tensioned against the cap of the wrench-ring G. The cam-ring is provided with three cam-slots, one for each lug. These slots form the cam-shoulder $f'$. Below the cam-shoulder is a retaining-shoulder $f^2$, from which leads a release-slot $f^3$. On the outer face or cap of the cam-ring are arranged finger-grip protrusions $f^4$, which can be engaged by the fingers to turn the cam-ring. The wrench-ring is provided with three straight slots $g$, the edges of which engage the lugs $e$ to lock the wrench-ring relatively with the lug-ring and the hub. These slots are of a depth sufficient to allow a longitudinal or axial movement of the wrench-ring inwardly by the lugs $e$ sufficient to bring the wrench-socket $g'$ into engagement with the nut, and vice versa. Normally the lugs $e$ engage the shoulders $f^2$, and the spring pressing on the cap of the wrench-ring has its pressure communicated to the cam-ring, thus pressing the whole mechanism outwardly and holding the retaining-shoulders $f^2$ in contact with the inside of the lugs $e$. The pressure of the spring is preferably sufficient to prevent rattling.

To operate the device, the cam-ring is pressed inwardly and turned. This brings the lugs $e$ into contact with the cam-shoulders $f'$ and locks the device in its inward position. If the nut is not in register with the wrench-socket, it can easily be moved to this position by turning the wheel so as to allow the inward and engaging movement of the device. The cam-shoulders may be serrated or roughened to better engage the lugs, but, as shown, they are of such slight pitch that the friction of the parts readily prevents the pressure of the spring from turning the cam back to place when the operator's fingers are removed, so that when the device is pushed in or moved longitudinally or axially and the cam-ring turned so as to bring the shoulders $f'$ under the lugs $e$, where they are seated by the spring, the device remains positively locked in its inward position and in engagement with the axle-nut, and as the wrench-ring is engaged directly by the lugs *e* rotative pressure upon it in either direction does not affect the cam-ring, so that when the cam is set the nut may be screwed on or off without unlocking the device.

The inward longitudinal movement of the wrench-ring should be sufficient to engage the outer face of the nut as well as the sides, so as to hold the nut in place relatively to the end of the box independently of the action of the spindle, so that when the wheel is removed from the spindle the nut will remain in position to receive the spindle-screw when the wheel is replaced. The pitch and length of the cam-shoulder should therefore be preferably sufficient to allow for the different thicknesses of washer, inequalities in the length of the nut, &c., and still effect the locking of the device in its engaging position under the different conditions.

When it is desired to remove the device to expose the nut for the purpose of adjusting the washer or otherwise, the cam-ring is turned or rotated toward the left. This brings the lugs *e* into the releasing-slot $f^3$, and the device can be readily withdrawn, and by reversing this operation the device can be returned to place. In order that there may be no danger of the device loosening itself, the shoulders $f^2$ are inclined slightly against the reverse or releasing movement, so that the pressure of the spring seats the lugs on the shoulders, so as to require pressure to effect the releasing turn.

In order that the spring may be retained in the device when removed, lugs should extend inwardly from the cam-ring or the wrench-ring, which will engage the spring as the lugs *e* pass through the releasing-slot. I have shown the lugs $g^2$ as extending inwardly from the wrench-ring for accomplishing this purpose. The position of these lugs $g^2$ should be nearer the hub than the lugs *e* when the shoulders $f^2$ are seated on the lugs *e*, so as not to interfere with the engagement of the spring with the lugs *e* when the device is at normal. It will be noted that the cam-ring F, with its face $f^5$, makes a closure of the hub-band, thus forming a dust-cap, and that it may be used with or without the wrench-ring. When used without the wrench-ring, the cam-shoulder $f'$ and adjacent slot are not necessary. It will also be noted that the lug-ring forms an ornamental extension to the point-band. This is especially true when the shoulder at the outer end of the ring is of a slightly larger diameter than the band, thus forming a bead.

The ring being secured directly to the hub and independently of the point-band obviates the danger of starting the paint at the juncture of the point-band with the hub when the rotative pressure is exerted in setting the nut. The extension formed by the ring gives the additional room necessary to the introduction of the locking device into the ordinary sizes of point-bands. This is especially true where the engagement is effected, as in the device shown, by a movement longitudinal to the axis of the hub.

What I claim as new is—

1. In a wheel-attaching device, the combination with the wheel-hub; the spindle; and the nut; of means carried with the hub for engaging the nut and locking the nut to move with the hub and a coiled spring arranged to exert its force in a direction longitudinally of the hub and to hold by this exerted force the locking means normally out of engagement.

2. In a wheel-attaching device, the combination with the wheel-hub; the spindle; and the nut; of means carried with the hub for engaging said nut and locking said nut to move with the hub; of a spring arranged to exert pressure in a direction longitudinally of the hub to hold said locking means normally out of engagement and to seat and hold the mechanisms of said means with sufficient force to prevent rattling.

3. In a wheel-attaching device, the combination with the wheel-hub; the spindle; and the nut; of lugs carried with the hub; means carried with the hub for engaging said nut and locking said nut to move with the hub; means brought to a retaining position on said lugs by rotative movement by said lugs for retaining said locking means in engagement; and a spring for seating said retaining means on said lugs.

4. In a wheel-attaching device, the combination with the wheel-hub; the spindle; and the nut; of lugs carried with the hub; means carried with the hub for engaging said nut and locking said nut to move with the hub; and means brought to a retaining position on said lugs by rotative movement by said lugs for retaining said locking means in engagement and the nut in place in the hub with the wheel removed.

5. In a hub-attaching device, the combination with the wheel-hub; the spindle and the nut; of a protecting ring or band at the outer point of the hub; means carried by the hub and within the protecting ring or band for locking the nut and wheel-hub together to screw on or off the nut by the turning of the wheel; and means also carried with the hub for retaining said locking means in engagement said means being arranged to be brought to a position for release from the hub by rotative movement of the means.

6. In a hub-attaching device, the combination with the wheel-hub; the spindle; and the nut; of lugs carried with the hub; of a ring as F having the retaining-shoulder $f^2$ and the releasing-slot $f^3$; and means carried with said ring F for locking the nut to move with the hub.

7. In a hub-attaching device, the combination with the hub; the spindle; and the nut;

of a protecting ring or band at the outer point of the hub; means carried within said band for locking by longitudinal movement of the means the axle-nut and the hub rotatively together; means brought to a retaining position by rotative movement for retaining said locking means against release by rotative pressure incident to the movement of the hub against the nut in either direction; and a dust-cap secured to said retaining means and provided with finger-grip protrusions covering said locking and retaining means.

8. In a hub-attaching device, the combination with the wheel-hub; the spindle; and the nut; of a protecting ring or band, lugs within said band; a wrench-ring locked by said lugs against rotative movement but free to move longitudinally thereby and having a wrench-socket adapted to engage the nut with the wrench-ring at its inward position; and a cam-ring having a cam-shoulder arranged to be brought into position on said lugs by rotative movement to retain the wrench-ring in its inward position.

9. In a hub-attaching device, the combination with the wheel-hub; the spindle; and the nut; of a protecting-band; lugs within said band; a wrench-ring locked by said lugs against rotative movement but free to move longitudinally thereby and having a wrench-socket adapted to engage the nut with the wrench-ring at its inward position; a cam-ring having a cam-shoulder arranged to be brought into position on said lugs by rotative movement to retain the wrench-ring in its inward position; and a spring arranged to press outwardly on the wrench-ring.

10. In a hub-attaching device, the combination with the wheel-hub; the spindle; and the nut; of a protecting-band; lugs within said band; a wrench-ring locked by said lugs against rotative movement but free to move longitudinally thereby and having a wrench-socket adapted to engage the nut with the wrench-ring at its inward position; a cam-ring having a cam-shoulder arranged to be brought into position on said lugs by rotative movement to retain the wrench-ring in its inward position and a dust-cap secured to or formed integrally with said cam-ring.

11. In a hub-attaching device, the combination with the wheel-hub; the spindle; and the nut; of a protecting ring or band; lugs within said band; a wrench-ring locked by said lugs against rotative movement but free to move longitudinally thereby and having a wrench-socket adapted to engage the nut with the wrench-ring at its inward position; and a cam-ring having a retaining-shoulder which is seated on said lugs to retain the cam and wrench rings in their outward positions and provided with a cam-shoulder arranged to be brought into position on said lugs to retain the wrench and cam rings in their inward positions.

12. In a hub-attaching device, the combination with the wheel-hub; the spindle; and the nut; of a protecting ring or band; lugs within said band; a wrench-ring locked by said lugs against rotative movement but free to move longitudinally thereby and having a wrench-socket adapted to engage the nut with the wrench-ring at its inward position; a cam-ring having a retaining-shoulder which is seated on said lugs to retain the cam and wrench rings in their outward positions and provided with a cam-shoulder arranged to be brought into position on said lugs to retain the wrench and cam rings in their inward positions; and a spring arranged to press outwardly on said wrench-ring at both its inward and outward position.

13. In a hub-attaching device, the combination with the wheel-hub; the spindle; and the nut; of a protecting ring or band; lugs within said band; a wrench-ring locked by said lugs against rotative movement but free to move longitudinally thereby and having a wrench-socket adapted to engage the nut with the wrench-ring at its inward position; and a cam-ring having a retaining-shoulder which is seated on said lugs to retain the cam and wrench rings in their outward positions and provided with a cam-shoulder arranged to be brought into position on said lugs to retain the wrench and cam rings in their inward position and also having a releasing-slot by way of which the cam-ring may be released from said lugs and the hub.

14. In combination with the wheel-hub; and the spindle-bearing; of a protecting ring or band carried by the hub at the outer end thereof; lugs within said ring or band; and a dust-cap and cam-ring F carried with the hub and having the retaining-shoulders $f^2$ and releasing-slots $f^3$ for the purposes set forth.

15. In combination with the wheel-hub; and the spindle-bearing of a protecting ring or band carried by the hub at the outer end thereof; lugs within said ring or band; a dust-cap and a cam-ring F carried with the hub and having the retaining-shoulders $f^2$ and releasing-slots $f^3$ for the purposes set forth; and a spring arranged to press outwardly on said dust-cap to seat the retaining-shoulders on the lugs.

16. In a wheel-attaching device, the combination with the wheel-hub; the spindle; the nut; and the point-band at the outer end of the hub; of a ring carried by the hub and secured to and fixed therewith and forming an extension to the hub-band; and means carried within said ring for locking the wheel-hub and nut together to screw on or off the nut.

17. In a wheel-attaching device, the combination with the wheel-hub; the spindle; the nut; and the point-band at the outer end of the hub; of a ring carried by the wheel-hub and locked against axial movement relatively to the hub by means independent of the point-band and arranged to form an extension to the point-band; and means carried within said ring for locking said ring with the nut for the purposes set forth.

18. In a wheel-attaching device, the combination with the wheel-hub; the spindle; the nut; and the point-band at the outer end of the hub; of a ring carried by the wheel-hub and locked against axial movement relatively to the hub by means independent of the point-band and arranged to form an extension to the point-band; and means carried within and by said ring for locking said ring with the nut for the purposes set forth.

In testimony whereof I affix my signature in presence of two witnesses.

RICHARD LORD.

Witnesses:
SAMUEL LORD,
WILLIAM W. TAYLOR.